(12) United States Patent
Staehle

(10) Patent No.: US 7,708,330 B2
(45) Date of Patent: May 4, 2010

(54) ADAPTER FOR FIXATION OF A ROBOTIC DRIVE IN A CAR

(76) Inventor: Dieter Staehle, 16, Feldbergstrasse, 75233, Tiefenbronn (DE)

( * ) Notice: Subject to any disclaimer, the term of this patent is extended or adjusted under 35 U.S.C. 154(b) by 304 days.

(21) Appl. No.: 11/845,578

(22) Filed: Aug. 27, 2007

(65) Prior Publication Data

US 2008/0246310 A1  Oct. 9, 2008

(30) Foreign Application Priority Data

Aug. 25, 2006  (DE) ..................... 10 2006 040 021

(51) Int. Cl.
*B60N 2/24* (2006.01)
*B60K 26/00* (2006.01)

(52) U.S. Cl. ................. 296/65.13; 73/129; 248/346.03; 248/424

(58) Field of Classification Search ............ 73/129; 248/346.01, 346.03, 346.05, 424, 429, 430, 248/674; 254/DIG. 5; 296/65.13
See application file for complete search history.

(56) References Cited

U.S. PATENT DOCUMENTS

| | | | | |
|---|---|---|---|---|
| 3,662,593 A | * | 5/1972 | Pirrello et al. ............ 73/132 |
| 3,713,332 A | * | 1/1973 | Herrbrich ............ 73/118.01 |
| 4,213,593 A | * | 7/1980 | Weik .................. 248/501 |
| 5,172,589 A | * | 12/1992 | Witt .................. 73/132 |
| 5,363,027 A | * | 11/1994 | Noguchi ............ 318/573 |
| 5,372,035 A | * | 12/1994 | Ogawa et al. ........ 73/118.01 |
| 5,394,743 A | * | 3/1995 | Noguchi et al. ...... 73/118.01 |
| 5,415,034 A | * | 5/1995 | Nishikawa et al. .... 73/118.01 |
| 5,835,867 A | * | 11/1998 | Froelich et al. ............ 701/2 |
| 2004/0113474 A1 | * | 6/2004 | Lambrecht et al. ...... 297/344.1 |

FOREIGN PATENT DOCUMENTS

| | | | | |
|---|---|---|---|---|
| GB | 2236366 A | * | 4/1991 |
| JP | 06129947 A | * | 5/1994 |
| JP | 09152388 A | * | 6/1997 |
| JP | 2005003591 A | * | 1/2005 |

* cited by examiner

*Primary Examiner*—Glenn Dayoan
*Assistant Examiner*—Paul A Chenevert
(74) *Attorney, Agent, or Firm*—Browdy and Neimark, PLLC

(57) ABSTRACT

A device for mounting a driving robot in a motor vehicle, the motor vehicle having two driver's seat tracks and a floor, utilizing the two seat tracks of the driver's seat for anchoring purposes, the device including: a length-adjustable adapter plate that engages into both seat tracks in a hook-like manner; at least one first locking element for locking the adapter plate in the seat tracks; and at least one second height-adjustable locking element for bracing the adapter plate against the vehicle floor.

11 Claims, 4 Drawing Sheets

ADAPTER FOR FIXATION OF A ROBOTIC DRIVE IN A CAR

BACKGROUND OF THE INVENTION

The present invention relates to a device for mounting a driving robot of a motor vehicle, utilizing, for anchoring purposes, the seat tracks of the driver's seat.

Driving robots serve to simulate the actions that would be performed by a driver in the operation of a motor vehicle in such a way that elements for operating the pedals, and optionally also turning the steering wheel, are actuated via one or more motors. The units that are required for this are disposed, as a rule, on or in the region of the driver's seat of the motor vehicle and must be securely anchored there to be able to carry out the driving actions to be controlled.

To achieve this anchoring, use can be made of the floor, the dashboard and the driver's seat, to which the driving robot is attachable by auxiliary means.

Devices are known in which anchoring of a driving robot is accomplished with the aid of the seat tracks of the driver's seat.

U.S. Pat. No. 5,415,034 discloses, referring particularly to FIG. 15, a device in which supporting rods are held by means of belts across the driver's seat. The lower ends of the belts hook over the seat tracks, which requires, however, that the seat tracks be designed accordingly. A secure horizontal anchoring is not possible with this solution.

JP-2005003591 A discloses a frame on which actuation elements for the foot pedals of the motor vehicle are flexibly arrangeable. This frame can be locked in place by means of bolt connections in suitable bores of the two driver's seat tracks. This solution, too, requires a precise adaptation to the specific design of the seat tracks, which serve as the sole mounting means. Devices for actuation of the steering wheel (steering robots) cannot be securely attached with this anchoring method.

U.S. Pat. No. 3,662,593, discloses a driving robot that is supported on the floor and rigidly secured overall relative to the lower edge of the dashboard for anchoring purposes.

BRIEF SUMMARY OF THE INVENTION

The present invention provides an improved device of the type known from JP 2005003591 A, cited above, for mounting a driving robot, in such a way that a universal adaptation to the seat tracks of different types of vehicles is made possible and a secure anchoring is achieved both horizontally and vertically.

The present invention provides a device of this type that it is suitable for accommodating a driving robot that may also include a steering robot.

The device according to the present invention is installable and removable quickly and without great difficulty and without disassembling the driver's seat.

More specifically, the present invention provides a device for mounting a driving robot in a motor vehicle, the motor vehicle having two driver's seat tracks and a floor, utilizing the two seat tracks of the driver's seat for anchoring purposes, the device comprising: a length-adjustable adapter plate that engages into both seat tracks in a hook-like manner; at least one first locking element for locking the adapter plate in the seat tracks; and at least one second height-adjustable locking element for bracing the adapter plate against the vehicle floor.

It may be viewed as an underlying concept of the invention that the central component, namely the length-adjustable adapter plate, is anchorable in the seat tracks with respect to the horizontal direction on one hand, and braced against the vehicle floor on the other hand and thus anchorable with respect to the vertical direction.

According to advantageous embodiments of the invention, this adapter plate can then be "upgraded" by the provision of height-adjustable supporting elements and a base plate, such that a receptacle surface for the components of a driving robot is created on the base plate.

Additional embodiments will be described below.

BRIEF DESCRIPTION OF THE DRAWINGS

A preferred exemplary embodiment of the invention will now be described in detail with reference to the drawings, in which.

DETAILED DESCRIPTION OF THE INVENTION

Referring to FIGS. 1-4, for fastening the front of a base plate 30 for a driving robot, a multi-part adapter plate 23 is provided. This adapter plate 23 is composed of a top plate 23A and a middle plate 23B.

Top plate 23A is provided for accommodating height-adjustable supporting elements 30A, 30B. Middle plate 23B is disposed beneath and adjacent top plate 23A and has two mutually horizontally offset projections through which are guided height-adjustable locking elements 20A, 20B that extend to the vehicle floor B.

Figure 1:
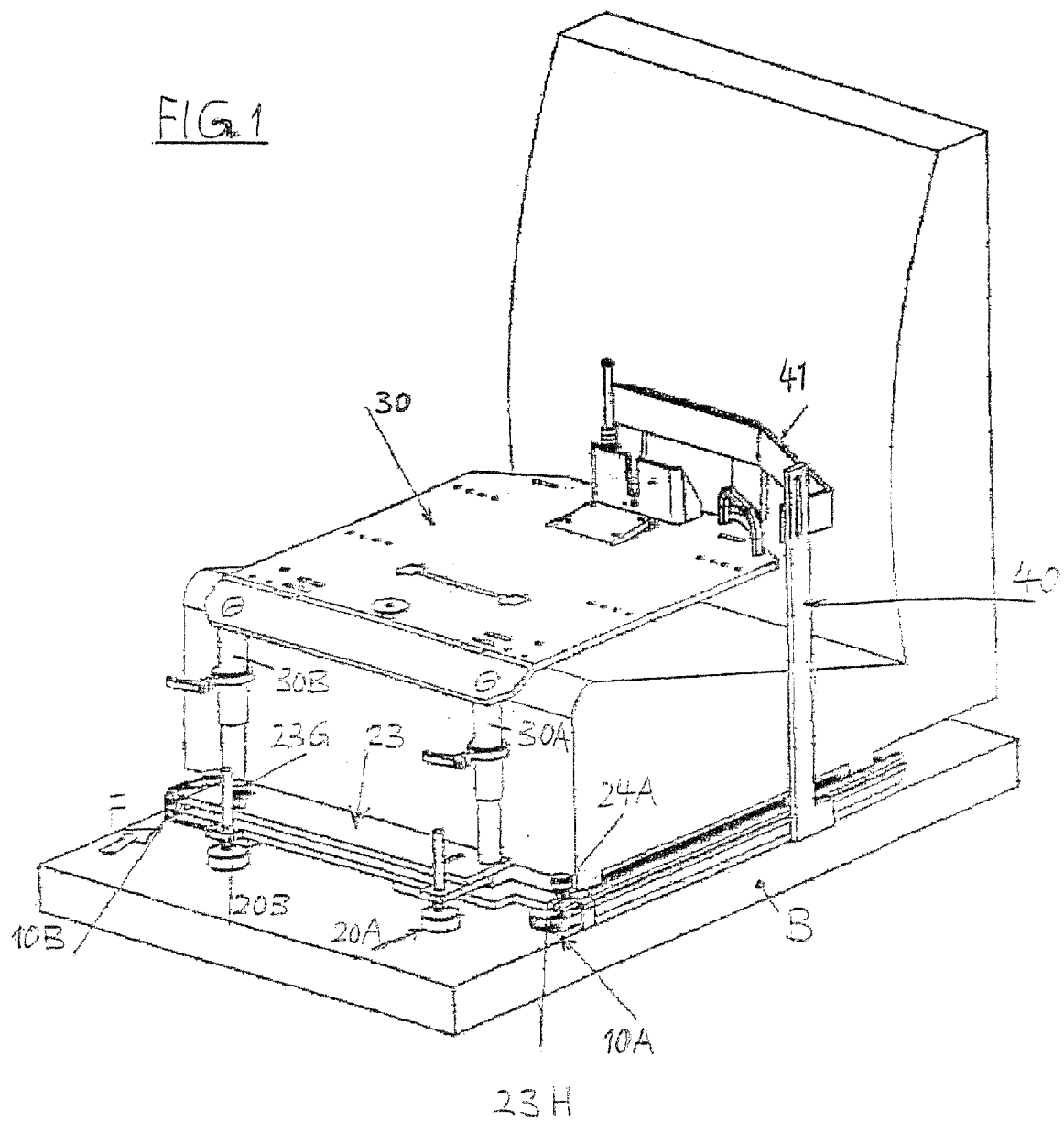
FIG. 1 is a perspective view of a preferred embodiment of a device according to the invention.
Figure 2:
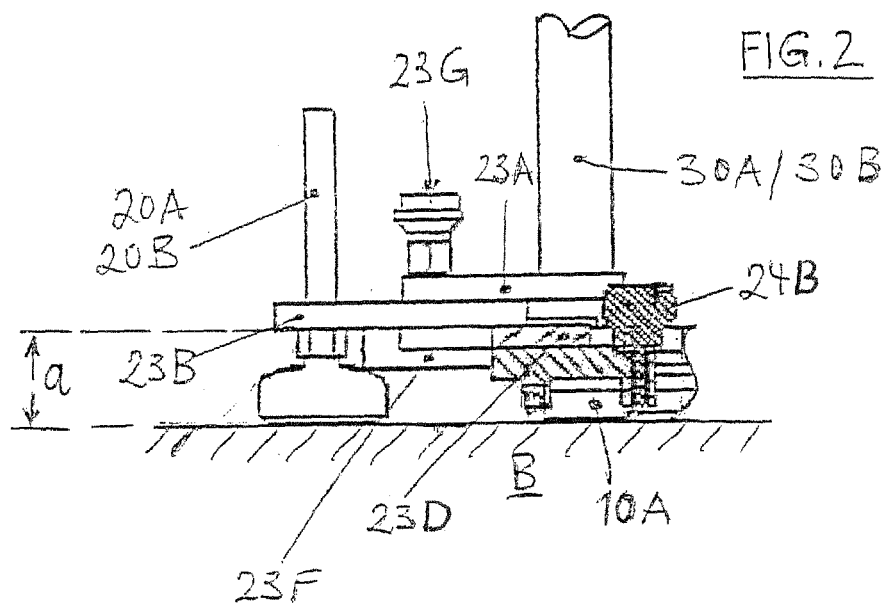
FIG. 2 is an elevational cross-sectional view in the plane X-X of FIG. 3.
Figure 3:
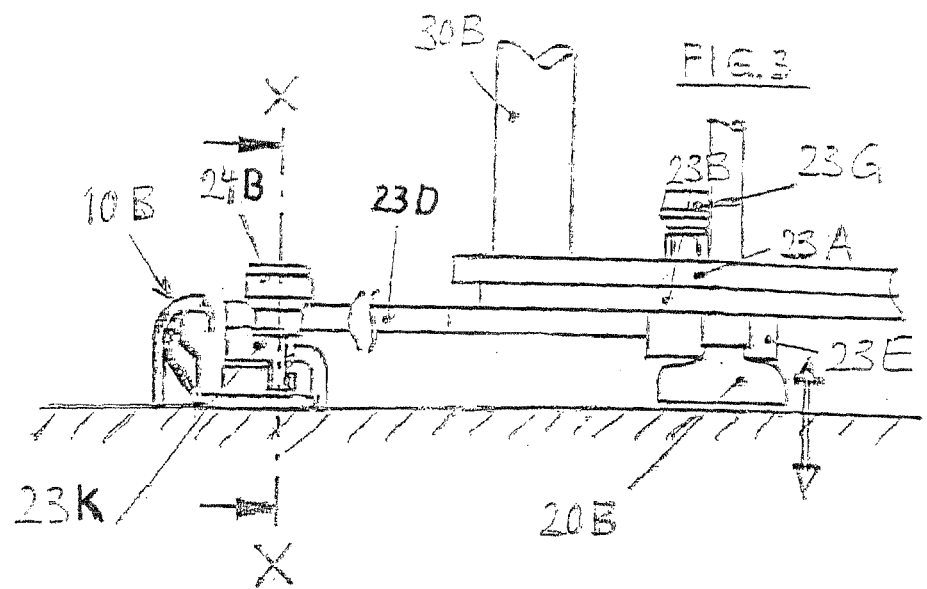
FIG. 3 is a front elevational detail view in the direction of the arrow F in FIG. 1.
Figure 4:
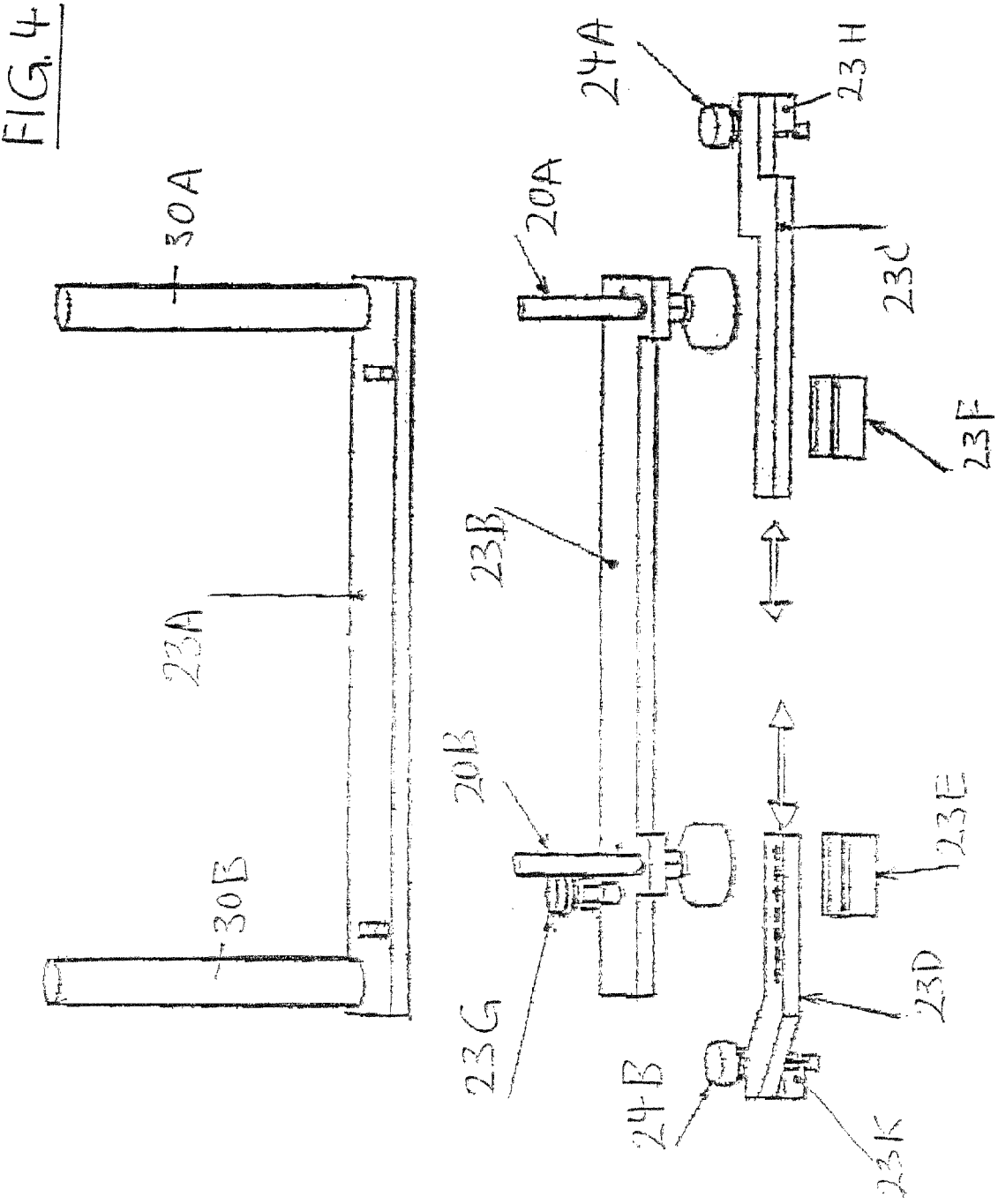
FIG. 4 is an exploded perspective view of the adapter plate of the embodiment of FIG. 1.

Referring to FIG. 2, the distance a from the lower front face of each of locking elements 20A, 20B to the underside of plate 23B is adjustable, for example by means of a threaded shaft, or shank, forming part of each locking element 20A, 20B and a nut secured to middle plate 23B.

Two arms 23C and 23D are mounted beneath middle plate 23B to each be horizontally slidable relative to middle plate 23B. For this purpose, middle plate 23B has disposed on, and fixed to, its underside guide plates 23E, 23F, in which the ends of arms 23C and 23D that face one another are horizontally slidable. Arms 23C and 23D may have snap-in holes (illustrated in the arm 23D), into which a locking element 23G (e.g., a snap-in button) engages for anchoring the arm in a selected position relative to plate 23B.

Arms 23C and 23D engage with their outer ends, which face away from one another, into the seat tracks 10A, 10B of the vehicle. For this purpose, the outer end of each of the two arms 23C and 23D has a hook-like engaging means 23H, 23K that fits into the profile of a respective seat track 10A, 10B in such a way that adapter plate 23 is horizontally displaceable in seat tracks 10A 10B parallel to the length dimension of the motor vehicle. Engaging means 23H, 23K are shaped to be inserted into, and moved along, seat tracks 10A 10B by a horizontal sliding movement from the fronts of the seat tracks and the seat tracks have a profile such that engaging means 23H, 23K cannot be lifted out of the tracks.

The engaging means 23H, 23K have threaded bores (not visible), into which respective locking elements 24A, 24B can be screwed, locking elements 24A, 24B serving to anchor adapter plate 23 horizontally in seat tracks 10A, 10B.

If the height-adjustable locking elements 20A, 20B are adjusted to be pressed against floor B of the vehicle, this results in the adapter plate being supported, so that the weight resting on plate 23 can be transferred to floor B.

Supporting elements 30A, 30B, are, in a conventional manner, height adjustable in a telescoping manner and lockable by means of locking elements. The upper ends of supporting elements 30A, 30B support, in any suitable manner, the front portion of base plate 30, which has various bores and elongated holes for anchoring a driving robot, which is not depicted.

Figure 5:
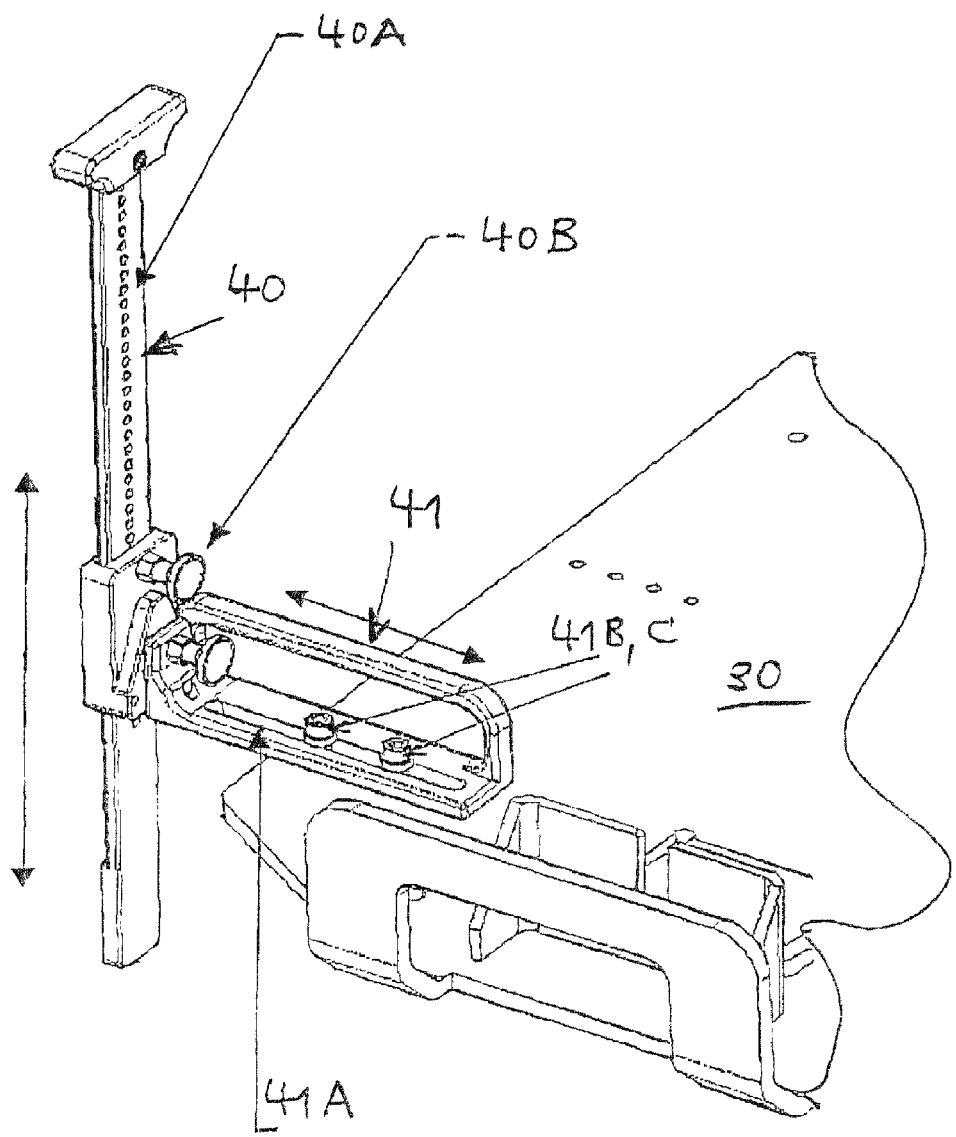
FIG. 5 is perspective detail view of rear support components of the embodiment of FIG. 1.

As shown in FIG. 5, the rear end of the base plate 30 has a support means consisting of at least one vertical support member 40 and a horizontal support member 41. Horizontal support member 41 is adjustable in height relative to vertical support member 40 by introduction of a pin, or screw, 40B into a selected hole, or recess, 40A of a vertical row of these holes, or recesses. Thus, base plate 30 can be anchored at any desired inclination for an optimal mounting of the driving robot. Support means 40, 41 is also width-adjustable in that horizontal support member 41 is provided with a horizontal slot 41A through which bolts, or screws, 41B, 41C extend. Bolts, or screws, 41B, 41C are screwed into mating threaded bores in plate 30.

The two supporting elements 30A, 30B and vertical support 40 thus permit a secure anchoring of base plate 30 to the vehicle floor B with the aid of the seat track profiles acting as "counter supports".

This application relates to subject matter disclosed in German Application number DE 102006040021.6, filed on Aug. 25, 2006, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A device for mounting a driving robot in a motor vehicle, the motor vehicle having a floor and two driver's seat tracks mounted on the floor, utilizing the two seat tracks of the driver's seat for anchoring purposes, said device comprising: a length-adjustable adapter plate that engages into both seat tracks in a hook-like manner; at least one first locking element for locking said adapter plate in the seat tracks; and at least one second height-adjustable locking element for bracing said adapter plate against the vehicle floor.

2. The device according to claim 1, further comprising: height-adjustable supporting elements supported on said adapter plate; a base plate for accommodating the driving robot supported by said supporting elements, said base plate having a front end and a rear end and said front end of said base plate being supported by said supporting elements; and a height-adjustable and width-adjustable support supported on the vehicle floor and supporting said rear end of said base plate.

3. The device according to claim 2, wherein said adapter plate comprises: a top plate for accommodating said supporting elements; a middle plate disposed below said top plate; and two second locking elements mounted to said middle plate.

4. The device according to claim 3, wherein said adapter plate further comprises: two arms having outer ends, said two arms being mounted beneath said middle plate and being slidable with respect to said middle plate transversely to the length dimension of the motor vehicle; and said at least one first locking element comprises engaging devices mounted at said outer ends of said two arms and adapted to engage with the seat tracks.

5. The device according to claim 4, wherein: said at least one first locking element comprises two first locking elements each engageable in a respective seat track; said two arms are provided with bores at said outer ends for holding said first locking elements; and said engaging devices are adapted to be clamped to the seat tracks.

6. The device according to claim 4, wherein at least one of said two arms is provided with bores for optionally accommodating a snap-in button disposed in said middle plate.

7. The device according to claim 2, wherein said support comprises at least one vertical support that rests on the vehicle floor.

8. The device according to claim 1, further comprising: height-adjustable supporting elements supported on said adapter plate; and a base plate for accommodating the driving robot supported by said supporting elements, said base plate having a front end and a rear end and said front end of said base plate being supported by said supporting elements; wherein said adapter plate comprises: a top plate for accommodating said supporting elements; a middle plate disposed below said top plate; and two second locking elements mounted to said middle plate.

9. The device according to claim 8, wherein said adapter plate further comprises: two arms having outer ends, said two arms being mounted beneath said middle plate and being slidable with respect to said middle plate transversely to the length dimension of the motor vehicle; and said at least one first locking element comprises engaging devices mounted at said outer ends of said two arms and adapted to engage with the seat tracks.

10. The device according to claim 9, wherein: said at least one first locking element comprises two first locking elements each engageable in a respective seat track; said two arms are provided with bores at said outer ends for holding said first locking elements; and said engaging devices are adapted to be clamped to the seat tracks.

11. The device according to claim 10, wherein at least one of said two arms is provided with bores for optionally accommodating a snap-in button disposed in said middle plate.

* * * * *